US012675816B2

(12) United States Patent
Scheibelhut et al.

(10) Patent No.: US 12,675,816 B2
(45) Date of Patent: Jul. 7, 2026

(54) USING A MACHINE LEARNING MODEL TO PREDICT A USER'S QUANTITY CEILING FOR DIFFERENT CATEGORIES OF ITEMS IN A CATALOG

(71) Applicant: Maplebear Inc., San Francisco, CA (US)

(72) Inventors: Brent Scheibelhut, Toronto (CA); Charles Wesley, San Diego, CA (US); Naval Shah, Toronto (CA); Mark Oberemk, Toronto (CA); Madeline Mesard, New York, NY (US)

(73) Assignee: Maplebear Inc., San Francisco, CA (US)

( * ) Notice: Subject to any disclaimer, the term of this patent is extended or adjusted under 35 U.S.C. 154(b) by 63 days.

(21) Appl. No.: 18/819,157

(22) Filed: Aug. 29, 2024

(65) Prior Publication Data

US 2026/0065345 A1      Mar. 5, 2026

(51) Int. Cl.
*G06Q 30/06* (2023.01)
*G06Q 30/0601* (2023.01)

(52) U.S. Cl.
CPC ..... *G06Q 30/0631* (2013.01); *G06Q 30/0641* (2013.01)

(58) Field of Classification Search
CPC ...................... G06Q 30/0631; G06Q 30/0641
USPC ............................................... 705/26.1, 26.7
See application file for complete search history.

(56) References Cited

U.S. PATENT DOCUMENTS

2007/0168261 A1* 7/2007 Hull ................... G06Q 30/0601
                                                          705/26.1
2010/0161388 A1* 6/2010 Guler .................... G06Q 40/04
                                                          705/26.1
2015/0302510 A1* 10/2015 Godsey ............... G06Q 10/087
                                                          705/26.81

(Continued)

FOREIGN PATENT DOCUMENTS

WO      WO-2023058807 A1 * 4/2023 ............. G06Q 30/06

OTHER PUBLICATIONS

R. Xiong, L. Yu and Y. Li, "Research on Sales Forecasting Model Based on Linear Regression Algorithm," 2024 International Conference on Data Science and Network Security (ICDSNS), Tiptur, India, 2024, pp. 1-5, retrieved from IP. Com on Dec. 25, 2025 (Year: 2024).*

(Continued)

*Primary Examiner* — Yogesh C Garg
(74) *Attorney, Agent, or Firm* — Fenwick & West LLP

(57) ABSTRACT

An online system trains a ceiling prediction model to determine a user's ceiling for one or more item categories. The user's ceiling for an item category is a maximum amount of an item within the item category the user is likely to include in an order. Based on previously fulfilled orders for the user, information describing a current order from the user, and contextual information about the order, the ceiling prediction model determines the user's ceiling for an item category. The online system leverages the user's ceiling for an item category to refine content about different items that is selected for presentation to a user. For example, the online system determines whether the order includes a quantity of items from an item category that equals the user's ceiling for the item category when determining which items to present to the user.

20 Claims, 4 Drawing Sheets

(56) References Cited

U.S. PATENT DOCUMENTS

| | | | |
|---|---|---|---|
| 2021/0192651 A1* | 6/2021 | Groth | G06N 3/09 |
| 2022/0044299 A1* | 2/2022 | Tate | G06Q 10/087 |
| 2022/0335493 A1* | 10/2022 | Sheng | G06Q 10/087 |
| 2023/0259440 A1* | 8/2023 | Akarapu | G06F 11/34 |
| | | | 726/23 |

OTHER PUBLICATIONS

K. Aditya Sobika et al. "A Study on Predicting Customer Willing-ness to Order Food Online During Covid-19 Pandemic Using Machine Learning Algorithms," 2021 4th International Conference on Computing and Communications Technologies (ICCCT), Chennai, India, 2021, pp. 236-241, retrieved from ip. com on 033026 (Year: 2021).*

* cited by examiner

USING A MACHINE LEARNING MODEL TO PREDICT A USER'S QUANTITY CEILING FOR DIFFERENT CATEGORIES OF ITEMS IN A CATALOG

BACKGROUND

Various online systems offer items for acquisition by users, with an online system receiving selection of one or more items from a user and providing the selected one or more items to the user. For example, a user includes one or more items in an order by selecting items via one or more interfaces generated and presented by the online system. Subsequently, the user receives the selected items from the online system. For example, the online system allocates an order from a user to a picker who obtains items included in the order from a source (e.g., a retailer) and delivers the obtained items to a location included in the order.

To simplify selection of items for an order, many online systems maintain item categories to provide a navigable hierarchy of items. Items in an item category may be considered to be equivalent to each other or may be replacements for each other in an order. For example, an item category of "milk" includes different brands of milk and different types of milk. Thus, items in an item category have one or more common attributes, so an item category provides a more general characterization of multiple items with one or more common attributes. A user may select an item category maintained by an online system to be presented with items offered by the online system in the selected item category. So item categories simplify review and selection of items by users of an online system.

When creating orders, different users may include different numbers of items from an item category in various orders. Further, various users may have a maximum quantity of items from an item category (also referred to as a "ceiling" of the item category) that are included in an order. For example, a user has a ceiling of three items from an item category for an order, so once the user includes three items from the item category in an order, the user is unlikely to include additional items from the item category in the order. However, an additional user has a ceiling of one item from the item category, after the additional user includes a single item from the item category in an order, the additional user is unlikely to include additional items from the item category in the order.

A user's ceiling for an item category affects a likelihood of the user interacting with different content presented by the online system to the user. For example, when a user has included a quantity of items from an item category equaling the user's ceiling for the item category in an order, the user is unlikely to interact with content identifying other items from the item category. Without determining a user's ceiling for an item category, conventional online systems expend computing resources on evaluating content for items within an item category with which the user is unlikely to interact to present to the user. Similarly, without determining a user's ceiling for an item category, conventional online systems allocate portions of a user client device's display area to content identifying items in an item category for which an order from the user has already reached the user's ceiling for the item category.

SUMMARY

In accordance with one or more aspects of the disclosure, an online system receives an order from a user that includes one or more items. In various embodiments, the order specifies a retailer or other source from which the items are obtained and a location for delivering the items. The online system obtains the items included in the order from the specified retailer or source and delivers the items to the location specified by the order. For example, the online system allocates the order to a picker, who obtains the items specified by the order from the retailer and delivers the items to the location.

To simplify creation of an order, the online system presents content to a user identifying one or more items available through the online system in various embodiments. For example, the online system presents one or more interfaces including items available through the online system. In various embodiments, the online system organizes items into one or more item categories. Items in an item category each have one or more common attributes. For example, an item category of "milk" includes different brands of milk and different types of milk. Hence, an item category provides a more general characterization of multiple items with one or more common attributes. In response to receiving a selection of an item category from a user, the online system presents the user with items included in the selected item category, allowing the user to review and to select one or more items from the selected item category for inclusion in an order. Further, each item that a user includes in an order is included in a corresponding item category.

In various embodiments, the online system also presents content identifying various items to a user for inclusion in an order. For example, the online system presents one or more recommended items in an interface, such as an interface from which the user creates an order, to simplify inclusion of one or more recommended items in an order by a user. The online system leverages prior orders created by the user when determining items identified by content presented to the user in various embodiments. Further, the online system may leverage prior orders from other users, such as users with one or more characteristics matching or similar to characteristics of the user to determine recommended items presented to the user.

Many users limit a quantity of items in an item category that they include in an order. Hence, a user may have a maximum quantity of items from an item category (also referred to as a ceiling for the item category) included in orders. The maximum quantity for an item category may be a number of items from the item category, an aggregate weight of items from the item category, an aggregate volume of items from the item category, an aggregate number of servings of items from the item category, or another unit of measure of items from the item category. When a quantity of items from an item category included in an order reaches the user's ceiling for the item category, the user is unlikely to include additional items from the item category in the order (i.e., has less than a threshold likelihood of including additional items from the item category in the order). For example, a user does not include more than three items from an item category of "junk food" in orders. Once a quantity of items in an item category included in an order equals the user's ceiling for the item category, the user is unlikely to interact with content identifying additional items from the item category or to include additional items from the item category in the order.

As many users interact with the online system through user client devices having limited display areas (e.g., mobile devices), presenting a user with content identifying items from an item category for which an order includes a quantity equaling the user's ceiling for the item category prevents identification of items the user is likely to include in the order using the limited display area of a user client device. Without accounting for a user's ceiling for one or more item categories and quantities of items from item categories in an order, the online system inefficiently uses limited display area available by various user client devices by presenting content identifying items the user is unlikely to include in the order. This reduces a number of overall items the user includes in an order and increases an amount of interaction by the user with the online system to select content items from item categories having ceilings for the user that have not already been reached by a quantity of items included in the order.

To more efficiently allocate portions of a user client device's display area for presenting content identifying items, when the online system receives an order from a user, the online system determines the user's ceiling for one or more item categories. In various embodiments, the online system applies a trained ceiling prediction model to information describing the order, contextual information about the order, and previously fulfilled orders for the user. The ceiling prediction model may receive an identifier of an item category along with the information describing the order, the contextual information about the order, and the previously fulfilled orders as input. In various embodiments, the ceiling prediction model determines the user's ceiling for each item category associated with at least one item in the order. In some embodiments, the ceiling prediction model determines the user's ceiling for an item category as a number of servings of items from the item category. Alternatively, the ceiling prediction model determines the user's ceiling for an item category as an aggregate volume of items from the item category, an aggregate weight of items from the item category, an aggregate number of items from the item category, or another aggregate unit or measurement of items from the item category.

The information describing the order includes the items included in the order, item categories associated with each item included in the order, a quantity of each item included in the order, and a time when the order was received. However, different or additional information describing the order may be received as input by the ceiling prediction model in various embodiments. Information about the order may be received from a picker client device, such as a smart shopping cart, of a picker fulfilling the order in some embodiments. For example, the picker client device identifies the quantity of an item included in the order.

Additionally, the online system determines contextual information about the order. For example, contextual information indicates a time of year or a time of day when the order was received or fulfilled. As another example, the contextual information indicates whether the order was received within a threshold amount of time of a holiday or of an occasion (e.g., an anniversary, a birthday, etc.) stored in association with the user. In some embodiments, the contextual information about the order may also identify a type of picker client device used to fulfill the order. For example, the contextual information about the order indicates whether a smart shopping cart is used to fulfill the order.

The online system also retrieves previously fulfilled orders for the user. In some embodiments, the online system retrieves previously fulfilled orders that the online system received from the user during a specific time interval. Alternatively or additionally, the online system retrieves previously fulfilled orders that the online system previously fulfilled during the specific time interval. For each previously fulfilled order, the online system determines items included in a previously fulfilled order, item categories associated with each item included in the previously fulfilled order, quantities of each item included in the previously fulfilled order, a time when the previously fulfilled order was received, or other information.

The ceiling prediction model is applied to training examples from a training dataset during a training process. During the training process, one or more parameters of the ceiling prediction model are modified through backpropagation based on a predicted ceiling for a training item category in a training example and a ceiling for the training item category. In some embodiments, the ceiling prediction model determines a ceiling for a specific item category in an order, while in other embodiments the ceiling prediction model determines a ceiling for each of a set of item categories in an order. For example, the online system determines the user's ceiling for each item category associated with at least one item in the order. Alternatively, the online system 140 determines the user's ceiling for a subset of item categories associated with at least one item in the order. Embodiments where the ceiling prediction model determines ceilings for multiple item categories allows the online system to evaluate relationships between ceilings of different item categories based on various item categories included in an order.

The online system leverages the user's ceiling for an item category to select content for presentation to the user. For example, the online system filters content items for presentation to the user based on the user's ceiling for an item category, removing content items associated with items included in an item category for which the order includes a quantity of items equaling the user's ceiling for the item category. This prevents the online system from allocating display area in a user client device for presenting content items for items in an item category where the order has reached the user's ceiling for the item category. Removing content items associated with items in an item category for which the order has already satisfied the user's ceiling also conserves computational resources expended by the online system by reducing a number of content items the online system analyzes for presentation to the user.

Alternatively or additionally, the online system modifies a ranking of one or more content items associated with items based on a quantity of items included in the order associated with an item category and the user's ceiling for the item category. In various embodiments, the online system ranks content items for presentation to the user based on one or more criteria and presents content items to the user based on the ranking. For example, the content items are search results presented in response to the online system receiving a search query or are content items in response to the user performing a specific action, such as indicating the user has completed selecting items for the order. As different content items are associated with items, the online system determines an item category including an item associated with a content item and compares a quantity of items from the item category included in the order with the user's ceiling for the item category. In some embodiments, the online system modifies the ranking of content items by decreasing a position of a content item associated with an item included in an item category in response to the order including a quantity of items from the item category associated with the item that equals the user's ceiling for the item category. Such modification decreases a likelihood of the user being presented with a content item associated with an item from an item category for which the order has reached the user's ceiling for the item category. Alternatively, the online system modifies the ranking by increasing the position of the content item in the ranking in response to the order including a quantity of items from an item category including the item that is less than the user's ceiling for the item category.

Further, the online system may generate 455 content for presentation to the user based on the user's ceiling for an item category. For example, the online system determines that a quantity of items in the order for an item category equals the user's ceiling for the item category and determines a user percentage of items in the order in the item category for the order. The online system additionally determines an additional percentage of items in the item category in orders received from additional users specifying the retailer as the order (or having one or more other characteristics in common with the user). The online system generates content for the user identifying the additional percentage of items in the item category in response to the user percentage being less than the additional percentage, with the generated content including a prompt or a suggestion for the user to include additional items from the item category in the order, even though the order has reached the user's ceiling for the item category. Such content may provide the user with an incentive to exceed the user's ceiling for the item category when including items in the order.

Alternatively or additionally, the online system generates content for the user based on one or more user preferences and the user's ceiling for one or more item categories. For example, the online system stores one or more characteristics of the user indicating a desired ceiling for an item category or indicating a desired percentage of items in an order from an item category. In response to determining the user's ceiling for an item category differs from the desired ceiling for the item category, the online system generates a prompt for the user to modify a quantity of items included in the item category included in the order. For example, in response to determining the user's ceiling for an item category exceeds the desired ceiling for the item category for the user, the online system generates a prompt for the user to remove one or more items in the item category from the order. As another example, in response to determining the user's ceiling for an item category in the order is less than the desired ceiling for the item category for the user, the online system generates a prompt for the user to add one or more items in the item category to the order.

Leveraging the order, the contextual information about the order, and previously fulfilled orders for the user allows the online system to determine a ceiling of the user for different item categories in the order. Accounting for the order itself when determining a ceiling for an item category allows the online system to dynamically adjust the ceiling for the item category based on changes in ordering patterns by the user. As the user's ceiling for an item category indicates a maximum number of items from the item category the user is likely to include in the order, the online system more efficiently selects content for presentation to the user by accounting for the user's ceiling for one or more item categories. As the user is unlikely to interact with content associated with items in an item category having a ceiling already reached by a quantity of items from the item category in the order, accounting for the user's ceiling for an item category prevents the online system from allocating display area of a user client device for content associated with items from an item category whose ceiling is already reached by the items included in the order. Further, the online system may filter out content items associated with items in an item category whose ceiling is already reached by the items included in the order from evaluation for presentation to the user, reducing computational resources used by the online system when selecting content for presentation to the user.

DETAILED DESCRIPTION

Figure 1:
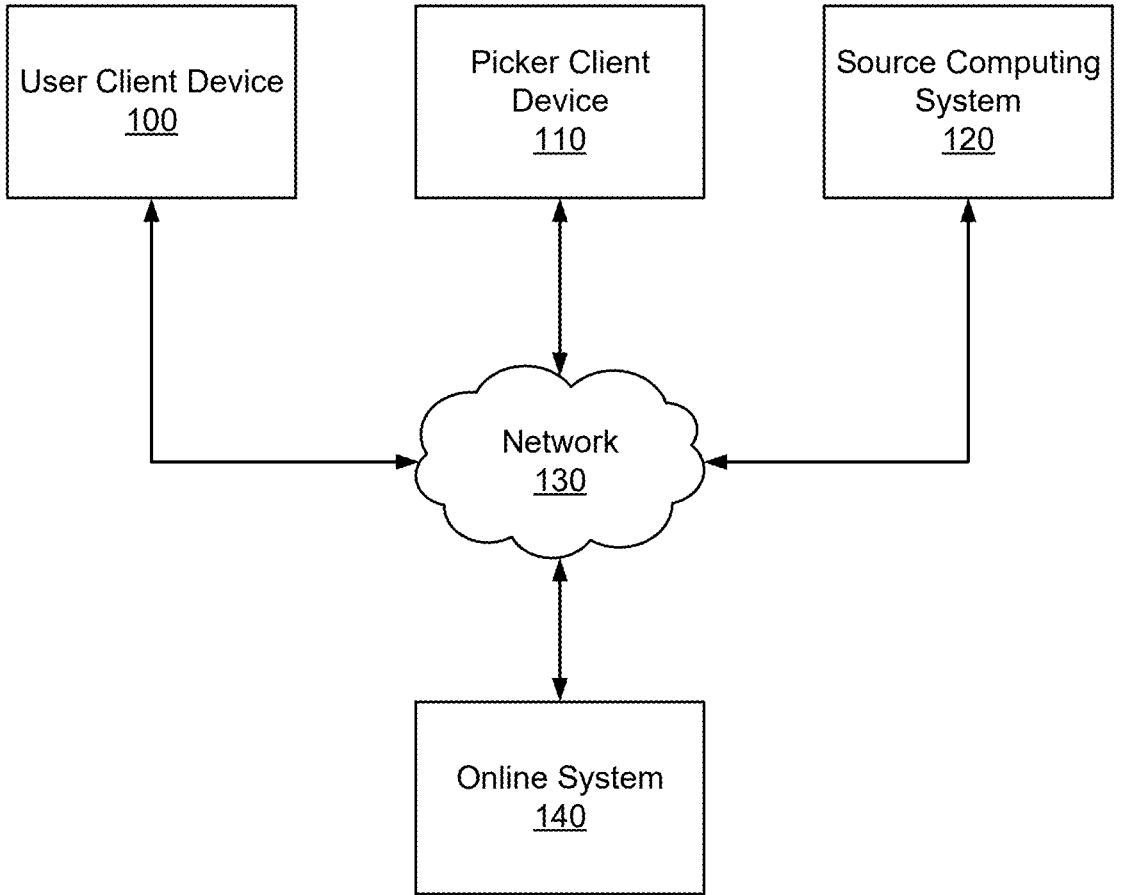
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
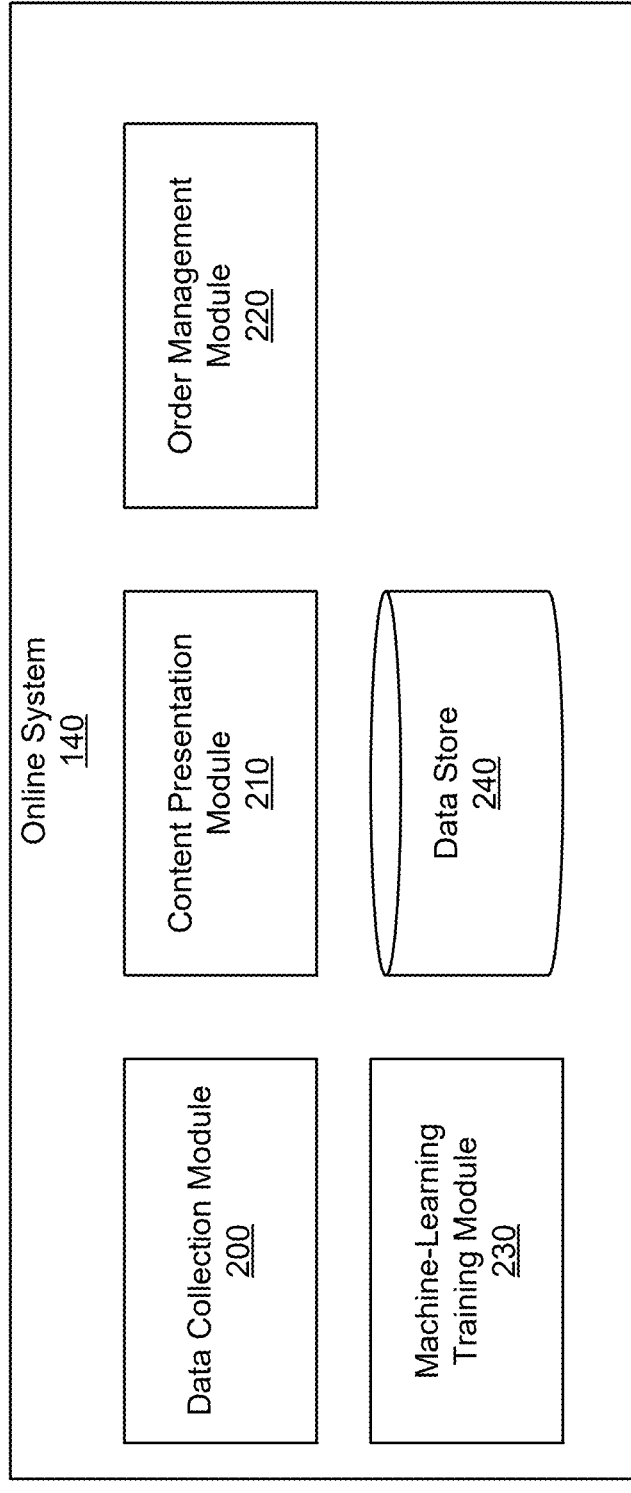
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/ source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

In various embodiments, the content presentation module 210 selects content items, or other content, identifying items for a user to include in an order. For example, the content presentation module 210 selects content items comprising search results for a search query and presents the search results to a user. As another example, the content presentation module 210 selects one or more content items for a user in response to determining the user performed one or more specific interactions, such as the user providing the online system 140 with an indication that the user has completed adding items to an order. Different content items are associated with different items offered by the online system 140, so presenting content items to a user identifies one or more items for inclusion in an order to the user.

When creating an order, many users have a maximum quantity of items in an item category included in the order, also referred to herein as the user's "ceiling" for the item category. Once an order being created by the user includes a quantity of items in an item category equaling the user's ceiling for the item category, the user has less than a threshold likelihood of including additional items from the item category in the order. Hence, presenting content items associated with items from an item category for which an order already satisfies the user's ceiling for the item category is unlikely to increase a number of items in the order or to increase user interaction with the online system 140. To more efficiently present content items to a user, the content presentation module 210 determines a user's ceiling for one or more item categories based on an order received from the user, contextual information describing the order, and previously fulfilled orders for the user, as further described below in conjunction with FIGS. 3 and 4. Based on quantities of items included in the order for an item category and the user's ceiling for the item category, the content presentation module 210 selects or modifies content presented to the user.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location.

When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The machine-learning training module 230 trains a ceiling prediction model to determine a user's ceiling for an item category. As further described above, the user's ceiling for an item category is a maximum quantity of items from the item category that the user includes in an order. In various embodiments, the ceiling prediction model receives information about an order from a user, contextual information about the order, and previously fulfilled orders for the user as an input and generates the user's ceiling for one or more item categories. In various embodiments, the ceiling prediction model receives information about an order from a user, contextual information about the order, and previously fulfilled orders for the user as an input and generates the user's ceiling for one or more item categories. The ceiling prediction model may additionally receive an item category as an input in various embodiments to generate the user's ceiling for the item category. Alternatively, the ceiling prediction model generates the user's ceiling for each of one or more item categories associated with an item included in the order.

As further described below in conjunction with FIG. 3, to train the ceiling prediction model, the machine-learning training module 230 initializes a set of weights comprising the ceiling prediction model and applies the ceiling prediction model to multiple training examples of a training dataset. Each training example includes a training history of previously fulfilled orders, information describing a training order, and contextual information about the training order, and may also include a training item category. A label is applied to each training example indicating a ceiling of a user for a training item category (or may indicate ceilings of the user for multiple training item categories). Applying the ceiling prediction model to a training example generates a predicted ceiling for the training item category. The machine-learning training module 230 scores the ceiling prediction model using a loss function based on a difference between the predicted ceiling for the training item category for a training example and the label applied to the training example. The machine-learning training module 230 updates the set of parameters comprising the ceiling prediction model based on the score generated by the loss function until one or more criteria are satisfied. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
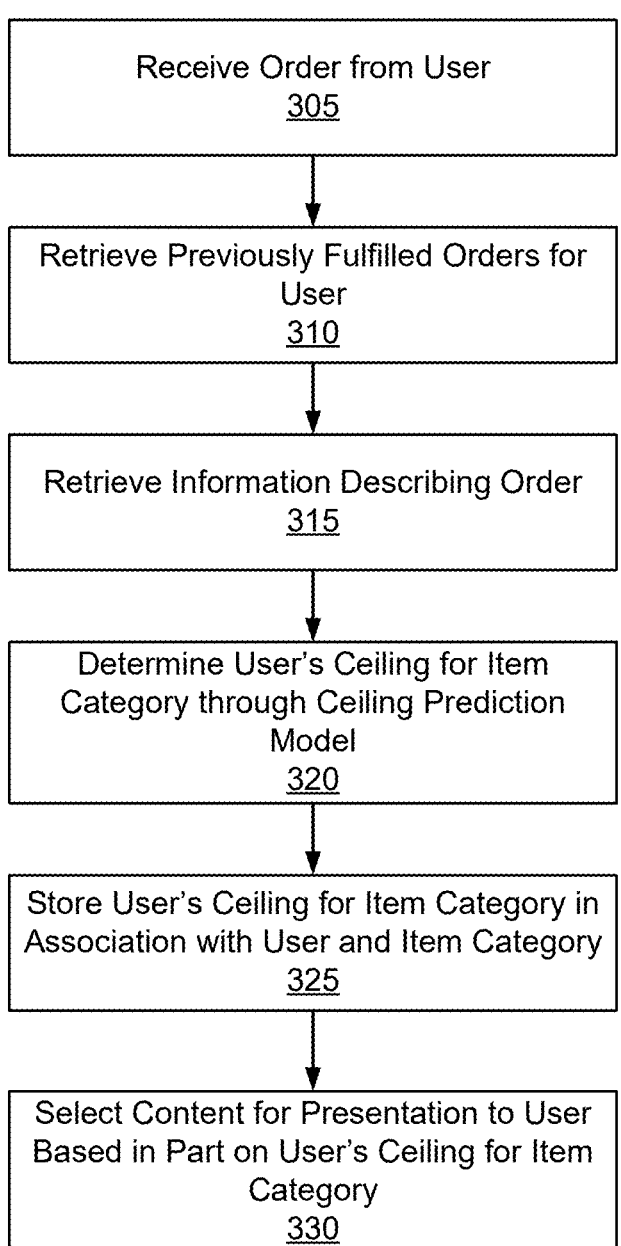
FIG. 3 illustrates a flowchart of a method for determining a ceiling for an item category for a user by applying a ceiling prediction model to an order from the user and to previously fulfilled orders from the user, in accordance with one or more embodiments.

FIG. 3 is a flowchart of a method for determining a ceiling for an item category for a user by applying a ceiling prediction model to an order from the user and to previously fulfilled orders from the user, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

An online system 140 allows a user to create one or more orders that each include one or more items accessible to the online system 140. Subsequently, the online system 140 obtains items included in an order for a user who created the order and provides the items to a location specified by the order. For example, the online system 140 allocates an order from a user to a picker, who obtains the items included in the order from a retailer included in the order and delivers the items to a location identified by the order. In other embodiments, the online system 140 differently delivers items included in an order to a user who created the order.

To simplify creation of orders, the online system 140 presents content to a user identifying one or more items available through the online system 140. For example, the online system 140 presents various content items each associated with a different item to a user through one or more interfaces. The user may select a content item to include a corresponding item in an order. In various embodiments, the online system 140 organizes items into one or more item categories. Items in an item category have one or more common attributes, so an item category provides a more generalized description that is applicable to items in the item category. For example, an item category of "milk" includes different brands of milk and different types of milk. As another example, an item category of "meat" includes different cuts of meat or different types of meat. In various embodiments, the online system 140 receives a selection of an item category from a user and presents items included in the selected item category to the user to simplify selection of one or more items in the item category for inclusion in an order.

Additionally, the online system 140 presents content items or other content, identifying various items to a user. For example, the online system 140 presents one or more content items that each identify a recommended item to a user in an interface, such as an interface from which the user creates an order. In response to the user performing one or more specific interactions with a content item, the online system 140 includes a recommended item identified by the content item in an order. The online system 140 may leverage prior orders created by the user to determine content items identifying recommended items to present to the user. For example, the online system 140 adjusts positioning of content items identifying different recommended items in search results presented to the user relative to other content items based on a frequency with which the user previously included items identified in content items in orders in some embodiments. As another example, the online system 140 determines one or more items that the user has previously included in at least a threshold number of orders (or has previously included in orders with at least a threshold rate) and presents content items identifying the determined one or more items to the user in one or more interfaces. Accounting for the user's prior interactions with items allows presentation of content items with which the user is more likely to interact by the online system 140.

When creating an order, many users limit a quantity of items in an item category that are included in the order from the user. A maximum quantity of items from the item category included in an order by the user is referred to herein as the user's "ceiling" for the item category. In various embodiments, the user's ceiling for an item category comprises a number of servings of items from the item category. Alternatively, the user's ceiling for an item category is an aggregate volume of items from the item category, an aggregate weight of items from the item category, an aggregate number of items from the item category, or another aggregate unit or measurement of items from the item category. When a user includes a quantity of items from an item category equaling the user's ceiling for the item category, the user has less than a threshold likelihood of including additional items from the item category in an order. For example, a user with a ceiling of three servings of items from an item category of "junk food" has less than a threshold likelihood of including additional items in the junk food category once an order includes items comprising three servings of items from the junk food category. As many users interact with the online system through user client devices 100 having limited display areas (e.g., mobile devices), presenting content items identifying items in an item category for which an order already includes a user's ceiling for the item category prevents presentation of content items identifying items more likely to be included in an order by the limited display area of the customer client device 100. This inefficient use of the limited display area available through many user client devices 100 increases a difficulty of users identifying various items to include in orders, reducing quantities of items in orders created by various users.

To identify items more efficiently for potential inclusion in orders to a user, when the online system 140 receives 305 an order from a user, the online system 140 retrieves 310 orders that the online system 140 previously fulfilled for the user. In some embodiments, the online system 140 retrieves 310 orders that the online system 140 previously received from the user during a specific time interval and previously fulfilled for the user. Alternatively or additionally, the online system 140 retrieves 310 orders that the online system 140 previously fulfilled for the user during the specific time interval. From retrieved information for a previously fulfilled order, the online system 140 determines items included in a previously fulfilled order, item categories for each item included in the previously fulfilled order, a quantity of each item included in the previously fulfilled order, and an item category including each item included in the previously fulfilled order.

Additionally, the online system 140 retrieves 315 information describing the order received 305 from the user. The information describing the order includes items currently included in the order, quantities of items included in the order, item categories of each item included in the order, and a time when the order was received 305. In various embodiments, the online system 140 retrieves 315 information describing the order from a picker client device 110 being used to fulfill the order. The information from the picker client device 110 indicates items from the order obtained by the picker, as well as quantities of items that the picker has obtained. A picker client device 110 may be a smart shopping cart, as further described above in conjunction with FIG. 1, in various embodiments.

Additionally, the online system 140 determines contextual information about the order from information about the order. For example, contextual information indicates a time of year or a time of day when the order was received. As another example, contextual information indicates whether the order was received within a threshold amount of time of a holiday or of an occasion stored in association with the user (e.g., a birthday, an anniversary, another occasion the online system 140 stores in association with the user). Contextual information about the order may also identify a type of picker client device 110 used to fulfill the order. For example, contextual information about the order indicates whether a smart shopping cart is being used to fulfill the order. However, other information about the picker client device 110 fulfilling the order may be determined in various embodiments.

The online system 140 determines 320 the user's ceiling an item category by applying a ceiling prediction model to the retrieved previously fulfilled orders, to the information describing the order, and to the contextual information about the order. In various embodiments, the ceiling prediction model also receives an identifier of an item category as input. The ceiling prediction model may determine 320 the user's ceiling for multiple item categories based on the retrieved previously fulfilled orders, the information describing the order, and the contextual information about the order in some embodiments.

The ceiling prediction model comprises a set of weights stored on a non-transitory computer readable storage medium in various embodiments. The online system 140 trains the ceiling prediction model by generating a training dataset including multiple training examples. Each training example includes a training history of previously fulfilled orders from, information describing a training order from, and contextual information about the training order. In various embodiments, to generate the training dataset, the online system 140 retrieves previously fulfilled orders from the user stored in the data store 240, while the online system 140 may retrieve previously fulfilled orders from multiple users, such as users each having one or more common characteristics. In various embodiments, a training example also includes a training item category. Each training example has a label indicating a ceiling for the training item category. In other embodiments, each training example includes multiple training item categories and a label applied to a training example includes an identifier of each training item category and a ceiling for each training item category.

To train the ceiling prediction model, the online concierge system 140 initializes the set of weights comprising the ceiling prediction model and applies the ceiling prediction model to multiple training examples of the training dataset. Applying the ceiling prediction model to multiple training examples updates the parameters (e.g., the weights) comprising the ceiling prediction model. The parameters comprising the ceiling prediction model transform the input data—information describing an order, contextual information about the order, and previously fulfilled orders—into a predicted ceiling for an item category. When applied to a training example, the ceiling prediction model generates a predicted training ceiling for a training item category of a training example based on the training history of previously fulfilled orders, information describing the training order, and contextual information about the training order in the training example. In some embodiments, the ceiling prediction model generates a predicted training ceiling for each of a set of training item categories of the training example.

For each training example to which the ceiling prediction model is applied, the online concierge system 140 generates a score comprising an error term based on the predicted training ceiling for a training item category and the label applied to the training example (or based on predicted training ceilings for multiple training item categories and the label applied to the training example). The error term is larger when a difference between the predicted training ceiling for the training item category and the label applied to the training example is larger and is smaller when the difference between the predicted training ceiling and the label applied to the training example is smaller. In various embodiments, the online concierge system 140 generates the error term using a loss function based on a difference between the predicted training ceiling for the training item category and the label applied to the training example using a loss function. Example loss functions include a mean square error function, a mean absolute error, a hinge loss function, and a cross-entropy loss function.

The online concierge system 140 backpropagates the error term to update the set of parameters comprising the ceiling prediction model and stops backpropagation in response to the error term, or to the loss function, satisfying one or more criteria. For example, the online concierge system 140 backpropagates the error term through the ceiling prediction model to update parameters of the ceiling prediction model until the error term has less than a threshold value. For example, the online system 140 may apply gradient descent to update the set of parameters. The online system 140 stores the set of parameters comprising the ceiling prediction model on a non-transitory computer readable storage medium after stopping the backpropagation.

In various embodiments, the online system 140 determines 320 a ceiling for multiple item categories using the ceiling prediction model. For example, the ceiling prediction model comprises a multitask model, with each task corresponding to a different item category, so the ceiling prediction model determines 320 the user's ceiling for different item categories. For example, the online system 140 determines 320 a ceiling for each item category including at least one item in the order. As another example, the online system 140 determines 320 a ceiling for each item category for which the order includes at least a threshold number of items. Determining multiple ceilings for different item categories with the ceiling prediction model allows the online system 140 to identify cross-effects between the user's ceilings for different item categories. For example, determining 320 the user's ceilings for multiple item categories represented in orders allows the online system 140 to determine whether an increase in the user's ceiling for an item category has a corresponding decrease in the user's ceiling for an additional item category.

The online system 140 stores 325 the user's ceiling for an item category in association with the item category and the user in various embodiments. In embodiments where the online system 140 determines 320 ceilings for multiple item categories, the online system 140 stores 325 each ceiling for an item category in association with the item category and with the user. The online system 140 may update the user's ceiling for the item category in response to receiving an additional order from the user and store 325 the updated ceiling for the item category in association with the user and with the item category in various embodiments.

Subsequently, the online system 140 selects 330 content for presentation to the user based at least in part on the user's ceiling for the item category. For example, the online system 140 presents content items to the user identifying candidate items inclusion in the order. The online system 140 selects candidate items based on measures of relevance of items to the user or to the order in some embodiments. Similarly, the online system 140 selects candidate items based on items included in prior orders fulfilled for the user in some embodiments. For example, candidate items are items included in one or more prior orders having at least a threshold measure of similarity to the order based on embeddings for the prior orders and an embedding for the order. When selecting 330 content items for one or more candidate items, the online system 140 determines a quantity of items in an item category included in the order and compares the quantity of items in the item category to the user's ceiling for the item category. In response to the quantity of items in the item category equaling the user's ceiling for the item category, the online system 140 filters content items by removing content items associated with items included in the item category. This reduces a number of content items from which the online system 140 selects 330 content items for the user by removing content items included in an item category for which the order already includes the user's ceiling of the item category from evaluation for presentation by the online system 140. Filtering out content items associated with items in the item category when the order satisfies the user's ceiling for the item category prevents the online system 140 from allocating available display area in a user client device 100 for identifying items from an item category where the order has reached the user's ceiling for the item category. In some embodiments, the online system 140 receives compensation from a third party (e.g., a retailer, an entity associated with an item) for presenting one or more of the content items for candidate items, and the online system 140 filters content items for which the online system 140 receives compensation in response to the quantity of items in an item category in the order equaling the user's ceiling for the item category. Hence, the online system 140 may filter content items for which the online system 140 receives compensation for presentation and content items for which the online system 140 does not receive compensation based on a quantity of items included in the order for an item category and the user's ceiling for the item category, as further described above.

Similarly, when selecting 330 content items associated with candidate items for presentation, the online system 140 ranks the content items based on one or more criteria (e.g., a measure of similarity to the user, a measure of similarity to one or more items included in the order, a frequency with which the user included the items in prior orders, etc.) and presents the content items in a sequence based on the ranking. In various embodiments, the online system 140 modifies the ranking of content items based on a quantity of items in the order for an item category and the user's ceiling for the item category. For example, the online system 140 modifies the ranking by decreasing a position in the ranking for a content item associated with an item in an item category in response to determining a quantity of items in the order for the item category equals the user's ceiling for the item category. This allows the online system 140 to present content items for items in one or more alternative item categories for which the order does not include a quantity of items equaling the user's ceiling for the one or more alternative item categories in higher positions of the ranking, so content items associated with items in one or more alternative item category are more accessible to the user. Alternatively, the online system 140 increases a position in the ranking of a content item associated with an item in an item category in response to determining a quantity of items in the order for the item category is less than the user's ceiling for the item category. Such a modification to the ranking increases a likelihood of the user being presented with one or more content items likely to increase a quantity of items in the item category included in the order.

The content items ranked for presentation may be included in search results in response to a search query from the user in some embodiments. Alternatively or additionally, the content items are ranked in response to the online system 140 receiving a specific interaction from the user. For example, the online system 140 presents one or more content items, selected 330 as further described above, to the user in response to receiving an indication from the user that the user has completed selecting items for the order, with the one or more content items identifying additional items for the user to include in the order before completing the order. As another example, the online system 140 selects 330 one or more content items for presentation to the user in response to receiving an indication from a picker fulfilling the order that the picker is preparing to check-out of a retailer, providing the user with an additional opportunity to add items to the order while the picker is in the retailer. Modifying a position of a content item associated with an item in the ranking adjusts the sequence in which content items are presented based on the user's ceiling for one or more item categories. Such modification of the ranking of content items more efficiently uses a display area of the user client device 100 to present content items for items in item categories for which the user has ceilings that have not been reached by quantities of items in the order.

In some embodiments, the online system 140 selects 330 content for the user prompting the user to increase the user's ceiling for an item category. For example, the online system 140 determines a quantity of items in the order for an item category equals the user's ceiling for the item category and determines a user percentage of items in the order for the item category. Additionally, the online system 140 determines an additional percentage of items in the item category in orders received from additional users having one or more characteristics matching one or more characteristics of the user (e.g., specifying a common retailer as the order, having a common geographic location as the user, having demographic information at least partially matching demographic information of the user, etc.). The additional percentage may be an average percentage of items in the item category in orders received from the additional users, a median percentage of items in the item category in orders received from the additional users, or another statistical measure of percentages of items in the item category in orders received from the additional users, etc.) The online system 140 selects 330 content for the user identifying the additional percentage of items in the item category in response to the user percentage being less than the additional percentage to prompt the user to include additional items from the item category in the order, even though the order has reached the user's ceiling for the item category. For example, the online system 140 generates a prompt identifying the additional percentage of items and including a suggestion to increase a quantity of items in the item category in the order.

Further, the online system 140 selects 330 content for the user based on one or more user preferences and the user's ceiling for the item category. For example, the online system 140 stores one or more characteristics of the user indicating a desired ceiling for an item category or indicating a desired percentage of items in an order from an item category. In response to determining the user's ceiling for the item category differs from the desired ceiling for the item category, the online system 140 generates a prompt for the user to modify a quantity of items included in the item category included in the order. For example, in response to determining the user's ceiling for the item category is greater than the desired ceiling for the item category, the online system 140 generates a prompt for the user indicating the user's ceiling for the item category is greater than the desired ceiling; in some embodiments, the prompt includes a suggestion to the user to remove one or more items in the item category from the order. Similarly, in response to determining the user's ceiling for the item category is less than the desired ceiling for the item category, the online system 140 generates a prompt for the user indicating the user's ceiling for the item category is less than the desired ceiling; in some embodiments, the prompt includes a suggestion to the user to add one or more additional items in the item category from the order, and may include identifiers of candidate items in the item category to add to the order. Hence, the online system 140 selects 330 different content for presentation to the user based on the user's ceiling for an item category to optimize a likelihood of the user interacting with content presented by the user client device 100.

Figure 4:
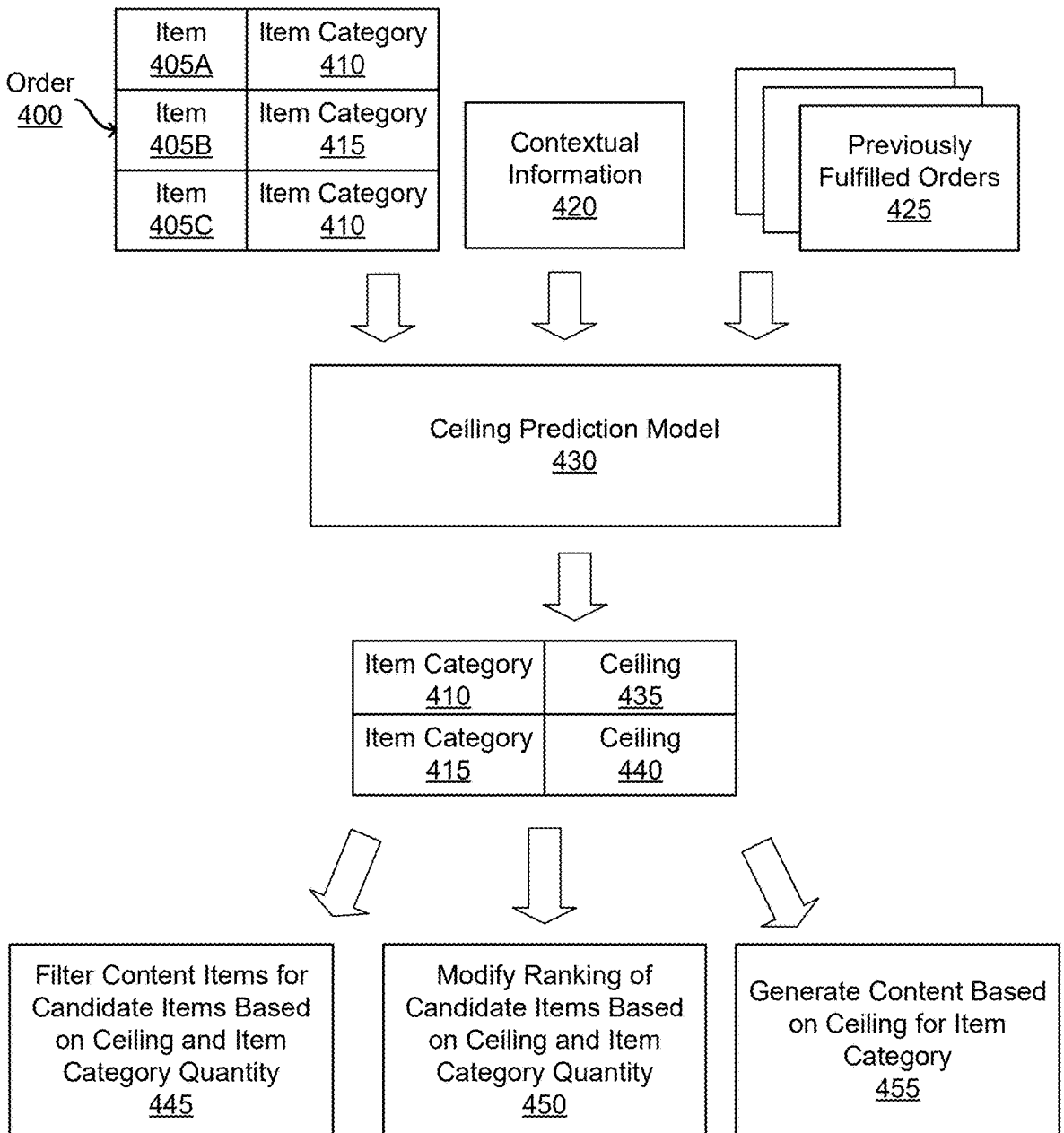
FIG. 4 illustrates a process flow diagram of a method for determining a ceiling for an item category for a user by applying a ceiling prediction model to an order from the user and to previously fulfilled orders from the user, in accordance with one or more embodiments.

FIG. 4 is a process flow diagram of a method for determining a ceiling for an item category for a user by applying a ceiling prediction model to an order from the user and to previously fulfilled orders from the user, in accordance with some embodiments. An online system 140 receives an order 400 from a user that includes one or more items 405A, 405B, 405C (also referred to individually and collectively using reference number 405). In various embodiments, the order 400 specifies a retailer or other source from which the items are obtained and a location for delivering the items 405. The online system 140 obtains the items 405 included in the order 400 from the specified retailer or source and delivers the items 405 to the location specified by the order 400. For example, the online system 140 allocates the order 400 to a picker, who obtains the items 405 specified by the order 400 from the retailer and delivers the items to a location specified by the order 400.

In various embodiments, to simplify creation of the order 400, the online system 140 presents content to a user identifying one or more items available through the online system 140. For example, the online system 140 presents one or more interfaces including items available via the online system 140 to user, who selects items for the order 400 by interacting with the one or more interfaces. In various embodiments, the online system 140 organizes items into one or more item categories. Items in an item category each have one or more common attributes. For example, an item category of "bread" includes different brands of bread and different types of bread. Hence, an item category provides a more general characterization of multiple items with one or more common attributes. In response to receiving a selection of an item category from a user, the online system 140 presents the user with items included in the selected item category, simplifying review and selection of one or more items from the selected item category for inclusion in the order 400. Each item 405 included in the order 400 is included in a corresponding item category. For purposes of illustration, the order 400 shown in FIG. 4 includes item 405A and item 405C from item category 410 and includes item 405B from item category 415.

Further, the online system 140 also presents content identifying various items to a user for inclusion in an order by the user. For example, the online system 140 presents one or more recommended items via content items in an interface, such as an interface from which the user creates an order, to simplify inclusion of one or more recommended items in the order 400. The online system 140 leverages prior orders created by the user when determining items identified by contend presented to the user. Further, the online system 140 may leverage prior orders from other users, such as users with one or more characteristics matching, or similar to, characteristics of the user to determine items to identify to the user through content presented to the user.

Many users limit a quantity of items in an item category that they include in an order. Hence, a user may have a maximum quantity of items from an item category (also referred to as a ceiling for the item category) included in orders. The maximum quantity for an item category may be a number of items from the item category, an aggregate weight of items from the item category, an aggregate volume of items from the item category, an aggregate number of servings of items from the item category, or another unit of measure of items from the item category. When a quantity of items from an item category included in an order from the user reaches the user's ceiling for the item category, the user has less than a threshold likelihood of including additional items from the item category in the order. For example, a user does not include more than three items from an item category of "junk food" in orders. Once a quantity of items in an item category included in an order equals the user's ceiling for the item category, the user is unlikely to interact with content identifying additional items from the item category when creating the order or to include additional items from the item category in the order.

As many users interact with the online system through user client devices 100 having limited display areas (e.g., mobile devices), presenting a user with content identifying items from an item category for which an order already includes a quantity equaling a user's ceiling for the item category prevents identification items the user is likely to include in the order in the limited display area of a user client device 100. Without accounting for a user's ceiling for one or more item categories and quantities of items in item categories in an order, the online system inefficiently uses limited display area available by various user client devices 100 by presenting content that identifies items the user is unlikely to include in an order. This reduces a number of overall items the user includes in an order and increases an amount of interaction by the user with the online system 140 to select items from item categories having ceilings not already reached by quantities of items already included in the order.

To more efficiently allocation portions of a user client device's display area for content identifying items likely to be included in the order 400 by the user, the online system 140 determines the user's ceiling for one or more item categories based on the order 400, contextual information 420 about the order, and previously fulfilled orders 425 for the user. As further described above, the online system 140 applies a trained ceiling prediction model 430 to information describing the order 400, to the contextual information 420 about the order, and to previously fulfilled orders 425 for the user to determine the user's ceiling for an item category. In various embodiments, the ceiling prediction model 430 receives an identifier of an item category along with the information describing the order 400, the contextual information 420 about the order, and the previously fulfilled orders 425 as input. In some embodiments, the ceiling prediction model 430 determines the user's ceiling for multiple item categories, such as for each item category associated with at least one item included in the order 400. The ceiling prediction model 430 may determine the user's ceiling for an item category as a number of servings of items from the item category. However, in other embodiments, the ceiling prediction model 430 determines the user's ceiling for an item category as an aggregate volume of items from the item category, as an aggregate weight of items from the item category, as an aggregate number of items from the item category, or as another aggregate unit of measurement of items from the item category.

In various embodiments, the information describing the order 400 includes the items 405 included in the order 400, item categories associated with each item 405 included in the order 400, a quantity of each item 405 included in the order 400, and a time when the order 400 was received. However, different or additional information describing the order 400 may be received as input by the ceiling prediction model 430 in various embodiments. Information about the order 400 may be received from a picker client device 110, such as a smart shopping cart, of a picker fulfilling the order in some embodiments. For example, the picker client device 110 identifies the number of an item 405 included in the order 400.

Additionally, the online system 140 determines contextual information 420 about the order 400. For example, contextual information 420 indicates a time of year or a time of day when the order was received or fulfilled. As another example, the contextual information 420 indicates whether the order 400 was received within a threshold amount of time of a holiday or of an occasion stored in association with the user (e.g., a birthday, an anniversary, another type of occasion the online system 140 stores in association with the user). In some embodiments, the contextual information 420 about the order may also identify a type of picker client device 110 used to fulfill the order. For example, the contextual information 420 about the order indicates whether a smart shopping cart is used to fulfill the order.

The online system 140 also retrieves previously fulfilled orders 425 for the user by the online system 140. In some embodiments, the online system 140 retrieves previously fulfilled orders 425 that the online system 140 received from the user during a specific time interval. Alternatively or additionally, the online system 140 retrieves previously fulfilled orders 425 that the online system 140 previously fulfilled during the specific time interval. For each previously fulfilled order 425, the online system 140 determines items included in a previously fulfilled order 425, item categories associated with each item included in the previously fulfilled order 425, quantities of each item included in the previously fulfilled order 425, a time when the previously fulfilled order 425 was received, or other information.

As further described above in conjunction with FIG. 3, the ceiling prediction model 430 is trained through application to a training dataset including multiple training examples to generate a ceiling for an item category for the user. The online system 140 may determine the user's ceiling for different item categories based on the order 400 in various embodiments. For example, the online system 140 determines the user's ceiling for each item category associated with at least one item in the order 400. Alternatively, the online system 140 determines the user's ceiling for a subset of item categories associated with at least one item in the order. Embodiments where the ceiling prediction model 430 determines the user's ceiling for multiple item categories allows the online system 140 to identify relationships between ceilings of different item categories. For example, based on the user's ceilings for different item categories determined for multiple orders, the online system 140 may determine whether a decrease in the user's ceiling for a particular item category results in an increase in the user's ceiling for another item category or may determine whether an increase in the user's ceiling for the particular item category results in an increase in the user's ceiling for another item category. In the example of FIG. 4, the online system 140 determines ceiling 435 as the user's ceiling for item category 410 and determines ceiling 440 as the user's ceiling for item category 415. Hence, ceiling 435 indicates a maximum quantity of items from item category 410 the user is likely to include in order 400, while ceiling 440 indicates a maximum quantity of items from item category 415 the user is likely to include in the order 400.

As further described above in conjunction with FIG. 3, the online system 140 leverages the user's ceiling for an item category and a quantity of items from the item category in the order 400 to select content for presentation to the user. For example, the online system 140 filters 445 content items for presentation to the user based on the user's ceiling for an item category, removing content items associated with items in an item category for which the order includes a quantity of items equaling the user's ceiling for the item category. For example, ceiling 435 for item category 410 is two items, and the order 400 includes two items, item 405A and item 405C, from item category 410, so the online system 140 filters content items associated with item category 410 from being presented to the user in the example of FIG. 4. This prevents the online system 140 from allocating display area in a user client device for presenting content items for items in an item category where the order has reached the user's ceiling for the item category. Removing content items associated with items in an item category for which the order 400 has already reached the user's ceiling for the item category also conserves computational resources expended by the online system 140 for selecting content items for presentation to the user by reducing a number of content items that the online system 140 evaluates.

Alternatively or additionally, the online system 140 modifies 450 a ranking of one or more content items associated with items based on a comparison of a quantity of items included in the order associated with an item category and the user's ceiling for the item category. In various embodiments, the online system 140 ranks content items for presentation to the user based on one or more criteria and presents content items to the user based on the ranking. For example, the content items are search results presented in response to the online system 140 receiving a search query. As another example, the content items are presented in response to the user performing a specific action, such as the user indicating completion of selecting items for the order 400 or the picker indicating the picker is preparing to check-out of a retailer when fulfilling an order. As different content items are associated with items, the online system 140 determines an item category including an item associated with a content item and compares a quantity of items from the item category included in the order 400 to the user's ceiling for the item category. In some embodiments, the online system 140 modifies 450 the ranking of content items by decreasing the position of a content item in the ranking in response to the order 400 including a quantity of items from the item category associated with the item that equals the user's ceiling for the item category. This decreases a likelihood of the user being presented with content items associated with items in an item category for which the order 400 has reached the user's ceiling for the item category. In the example of FIG. 4, ceiling 435 for item category 410 is two items, and the order includes two items, item 405A and item 405C, from item category 410; hence, in some embodiments, the online system 140 decreases a position in a ranking of a content item associated with an item from item category 410. Alternatively, the online system 140 modifies 450 the ranking of content items by increasing a position of a content item associated with an item in the ranking by increasing the position of the content item in the ranking in response to determining the order 400 includes a quantity of items from an item category including the item that is less than the user's ceiling for the item category. For example, ceiling 440 for item category 415 is three items in FIG. 4, and the order 400 includes a single item from item category 415, so the online system 140 increases a position in the ranking of a content item associated with an item from item category 415 to increase visibility of the content item associated with the item from item category 415 to the user.

Further, the online system 140 may generate 450 content for presentation to the user based on the user's ceiling for an item category. For example, the online system 140 determines that a quantity of items in the order 400 for an item category equals the user's ceiling for the item category and determines a user percentage of items in the order in the item category for the order. The online system 140 additionally determines an additional percentage of items in the item category in orders received from additional users having one or more characteristics in common with the user (e.g., having a geographic location matching a geographic location of the user, specifying the same retailer for fulfilling the order, having demographic information matching at least a portion of the demographic information of the user, etc.). The online system 140 generates 450 content for the user identifying the additional percentage of items in the item category in response to the user percentage being less than the additional percentage. In some embodiments, the content includes a prompt or a suggestion for the user to include additional items from the item category in the order, even though the order 400 has reached the user's ceiling for the item category. Such content may provide the user with an incentive to exceed the user's ceiling for the item category when selecting items for the order 400.

Alternatively or additionally, the online system 140 generates 450 content for the user based on one or more user preferences and the user's ceiling for one or more item categories. For example, the online system 140 stores one or more characteristics of the user indicating a desired ceiling for an item category or indicating a desired percentage of items in an order from an item category. In response to determining the user's ceiling for an item category differs from the desired ceiling for the item category, the online system 140 generates a prompt for the user to modify a quantity of items included in the item category included in the order. In the example of FIG. 4, the online system 140 determines ceiling 435 for item category 410 is two and determines the user has a desired ceiling of one item from item category 410, so the online system 140 generates 450 generates a prompt for the user indicating ceiling 435 is greater than the desired ceiling for item category 410. Such content may include a suggestion to the user to remove an item in item category 410 from the order 400. Similarly, the online system 140 may generate 450 content for the user to add one or more items from an item category for which the user's ceiling for the item category is less than the desired ceiling for the item category.

Leveraging the order 400, the contextual information 420 about the order 400, and previously fulfilled orders 425 for the user allows the online system 140 to determine a ceiling of the user for different item categories in the order. Accounting for the order 400 when determining the user's ceiling for an item category allows the online system 140 to dynamically adjust the user's ceiling for the item category over time based on changes in ordering patterns by the order. As the user's ceiling for an item category indicates a maximum number of items from the item category the user is likely to include in the order, the online system 140 more efficiently selects content for presentation to the user by accounting for the user's ceiling for one or more item categories. As the user is unlikely to interact with content associated with items in an item category having a ceiling already reached by a quantity of items from the item category in the order, accounting for the user's ceiling for an item category prevents the online system 140 from allocating display area of a user client device 110 for content associated with items from an item category whose ceiling is already reached by the items included in the order. Further, the online system 140 may filter out content associated with items in an item category whose ceiling is already reached by the items included in the order from evaluation for presentation to the user, reducing computational resources used by the online system 140 when selecting content for presentation to the user.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at an online computer system comprising a processor and a computer-readable medium, comprising:

receiving, at the online computer system, an order from a user, the order including one or more items, each item having a corresponding item category;

retrieving one or more previously fulfilled orders for the user that the online computer system previously fulfilled;

identifying a ceiling of the user for an item category by applying a ceiling prediction model to information describing the order, the information describing the order including quantities of items included in the order and to the one or more previously fulfilled orders, the ceiling of the user for the item category comprising a maximum quantity of items from the item category likely to be included in the order, wherein the ceiling prediction model comprises a machine-learning model trained by:

obtaining a training dataset including a plurality of training examples, each training example including, a training item category, a training history of previously fulfilled orders, information describing a training order, and contextual information about the training order, each training example having a label indicating a ceiling for the training item category;

applying the ceiling prediction model to each training example of the training dataset to generate a predicted ceiling for the training item category;

scoring the ceiling prediction model using a loss function and the label of the training example; and updating one or more parameters of the ceiling prediction model by backpropagation based on the scoring until one or more criteria are satisfied;

dynamically adjusting the identified ceiling of the user for the item category based on changes in ordering patterns by the user;

selecting content for presentation by the online computer system to the user based on the adjusted ceiling of the user for the item category, wherein selecting content based on the adjusted ceiling of the user for the item category further comprises:

generating a set of content items for display in a user interface; and based on a comparison of the identified adjusted ceiling of the user for the item category and a quantity of items in the item category included in the set of content items for display, removing one or more of the items in the item category from the generated set of content items for display; and sending the selected content to a device of the user, the sending causing the device of the user to display the selected content.

2. The method of claim 1, wherein selecting content for presentation by the online computer system to the user based on the adjusted ceiling of the user for the item category comprises: filtering content items associated with items by removing content items associated with items from the item category in response to the online computer system determining the order includes a quantity of items associated with the item category equaling the adjusted ceiling of the user for the item category; and selecting one or more of the filtered content items for presentation to the user.

3. The method of claim 1, wherein selecting content for presentation by the online computer system to the user based on the adjusted ceiling of the user for the item category comprises: ranking content items associated with items for the user based on one or more criteria; modifying the ranking by decreasing a position in the ranking of a content item associated with an item from the item category in response to the online computer system determining the order includes a quantity of items associated with the item category equaling the adjusted ceiling of the user for the item category; and selecting one or more of the ranked content items for presentation to the user based on the modified ranking.

4. The method of claim 1, wherein selecting content for presentation by the online computer system to the user based on the adjusted ceiling of the user for the item category comprises: ranking content items associated with items for the user based on one or more criteria; modifying the ranking by increasing a position in the ranking of a content item associated with an item from the item category in response to the online computer system determining the order includes a quantity of items associated with the item category less than the adjusted ceiling of the user for the item category; and selecting one or more of the ranked content items for presentation to the user based on the modified ranking.

5. The method of claim 1, wherein selecting content for presentation by the online computer system to the user based on the ceiling of the user for the item category comprises: retrieving a desired ceiling for the item category stored in association with the user by the online computer system; generating a prompt for the user in response to the online computer system determining the adjusted ceiling of the user for the item category exceeds the desired ceiling for the item category; and sending the prompt to a graphical user interface of the device of the user, causing the device of the user to display the prompt.

6. The method of claim 5, wherein generating the prompt comprises including, in the generated prompt, a suggestion for the user to remove an item included in the item category from the order.

7. The method of claim 1, wherein identifying the ceiling of the user for the item category by applying the ceiling prediction model to information describing the order and to the one or more previously fulfilled orders comprises:

applying the ceiling prediction model to information describing the order, to contextual information about the order, and to the one or more previously fulfilled orders.

8. The method of claim 7, wherein applying the ceiling prediction model to contextual information describing the order comprises applying the ceiling prediction model to one or more of: a time of year when the order was received, a time of day when the order was received, an indication whether the order was received within a threshold amount of time of a holiday, an indication whether the order was received within a threshold amount of time of an occasion the online computer system stored in association with the user, a type of picker client device used by a picker fulfilling the order, or any combination thereof.

9. The method of claim 8, wherein a type of picker client device used by a picker fulfilling the order indicates whether the picker client device is a smart shopping cart.

10. A computer program product comprising a non-transitory computer readable storage medium having instructions encoded thereon that, when executed by a processor, cause the processor to perform steps comprising:

receiving, at an online computer system, an order from a user, the order including one or more items, each item having a corresponding item category;

retrieving one or more previously fulfilled orders for the user that the online computer system previously fulfilled;

identifying a ceiling of the user for an item category by applying a ceiling prediction model to information describing the order, the information describing the order including quantities of items included in the order and to the one or more previously fulfilled orders, the ceiling of the user for the item category comprising a maximum quantity of items from the item category likely to be included in the order, wherein the ceiling prediction model comprises a machine-learning model trained by:

obtaining a training dataset including a plurality of training examples, each training example including, a training item category, a training history of previously fulfilled orders, information describing a training order, and contextual information about the training order, each training example having a label indicating a ceiling for the training item category;

applying the ceiling prediction model to each training example of the training dataset to generate a predicted ceiling for the training item category;

scoring the ceiling prediction model using a loss function and the label of the training example; and updating one or more parameters of the ceiling prediction model by backpropagation based on the scoring until one or more criteria are satisfied;

dynamically adjusting the identified ceiling of the user for the item category based on changes in ordering patterns by the user;

selecting content for presentation by the online computer system to the user based on the adjusted ceiling of the user for the item category, wherein selecting content based on the adjusted ceiling of the user for the item category further comprises:

generating a set of content items for display in a user interface; and based on a comparison of the identified adjusted ceiling of the user for the item category and a quantity of items in the item category included in the set of content items for display, removing one or more of the items in the item category from the generated set of content items for display; and sending the selected content to a device of the user, the sending causing the device of the user to display the selected content.

11. The computer program product of claim 10, wherein selecting content for presentation by the online computer system to the user based on the adjusted ceiling of the user for the item category comprises: filtering content items associated with items by removing content items associated with items from the item category in response to the online computer system determining the order includes a quantity of items associated with the item category equaling the adjusted ceiling of the user for the item category; and selecting one or more of the filtered content items for presentation to the user.

12. The computer program product of claim 10, wherein selecting content for presentation by the online computer system to the user based on the adjusted ceiling of the user for the item category comprises: ranking content items associated with items for the user based on one or more criteria; modifying the ranking by decreasing a position in the ranking of a content item associated with an item from the item category in response to the computer system determining the order includes a quantity of items associated with the item category equaling the adjusted ceiling of the user for the item category; and selecting one or more of the ranked content items for presentation to the user based on the modified ranking.

13. The computer program product of claim 10, wherein selecting content for presentation by the online computer system to the user based on the adjusted ceiling of the user for the item category comprises: ranking content items associated with items for the user based on one or more criteria; modifying the ranking by increasing a position in the ranking of a content item associated with an item from the item category in response to the online computer system determining the order includes a quantity of items associated with the item category less than the adjusted ceiling of the user for the item category; and selecting one or more of the ranked content items for presentation to the user based on the modified ranking.

14. The computer program product of claim 10, wherein selecting content for presentation by the online computer system to the user based on the ceiling of the user for the item category comprises: retrieving a desired ceiling for the item category stored in association with the user by the online computer system; generating a prompt for the user in response to the online computer system determining the adjusted ceiling of the user for the item category exceeds the desired ceiling for the item category; and sending the prompt to a graphical user interface of the device of the user, causing the device of the user to display the prompt.

15. The computer program product of claim 14, wherein generating the prompt comprises including, in the generated prompt, a suggestion for the user to remove an item included in the item category from the order.

16. The computer program product of claim 10, wherein identifying the ceiling of the user for the item category by applying the ceiling prediction model to information describing the order and to the one or more previously fulfilled orders comprises:

applying the ceiling prediction model to information describing the order, to contextual information about the order, and to the one or more previously fulfilled orders.

17. The computer program product of claim 16, wherein applying the ceiling prediction model to contextual information describing the order comprises applying the ceiling prediction model to one or more of: a time of year when the order was received, a time of day when the order was received, an indication whether the order was received within a threshold amount of time of a holiday, an indication whether the order was received within a threshold amount of time of an occasion the online computer system stored in association with the user, a type of picker client device used by a picker fulfilling the order, or any combination thereof.

18. The computer program product of claim 17, wherein a type of picker client device used by a picker fulfilling the order indicates whether the picker client device is a smart shopping cart.

19. A system comprising: a processor; and a non-transitory computer readable storage medium having instructions encoded thereon that, when executed by the processor, cause the processor to perform steps comprising:

receiving, at an online computer system, an order from a user, the order including one or more items, each item having a corresponding item category;

retrieving one or more previously fulfilled orders for the user that the online computer system previously fulfilled;

identifying a ceiling of the user for an item category by applying a ceiling prediction model to information describing the order, the information describing the order including quantities of items included in the order and to the one or more previously fulfilled orders, the ceiling of the user for the item category comprising a maximum quantity of items from the item category likely to be included in the order, wherein the ceiling prediction model comprises a machine-learning model trained by:

obtaining a training dataset including a plurality of training examples, each training example including, a training item category, a training history of previously fulfilled orders, information describing a training order, and contextual information about the training order, each training having a label indicating a ceiling for the training item category;

applying the ceiling prediction model to each training example of the training dataset to generate a predicted ceiling for the training item category;

scoring the ceiling prediction model using a loss function and the label of the training example; and updating one or more parameters of the ceiling prediction model by backpropagation based on the scoring until one or more criteria are satisfied;

dynamically adjusting the identified ceiling of the user for the item category based on changes in ordering patterns by the user;

selecting content for presentation by the online computer system to the user based on the adjusted ceiling of the user for the item category, wherein selecting content based on the adjusted ceiling of the user for the item category further comprises:

generating a set of content items for display in a user interface; and based on a comparison of the identified adjusted ceiling of the user for the item category and a quantity of items in the item category included in the set of content items for display, removing one or more of the items in the item category from the generated set of content items for display; and sending the selected content to a device of the user, the sending causing the device of the user to display the selected content.

20. The system of claim 19, wherein selecting content for presentation by the online computer system to the user based on the adjusted ceiling of the user for the item category comprises:

filtering content items associated with items by removing content items associated with items from the item category in response to the online computer system determining the order includes a quantity of items associated with the item category equaling the adjusted ceiling of the user for the item category; and selecting one or more of the filtered content items for presentation to the user.

* * * * *